United States Patent
Shimizu et al.

(10) Patent No.: US 11,976,739 B2
(45) Date of Patent: May 7, 2024

(54) SOLENOID VALVE

(71) Applicant: NIDEC TOSOK CORPORATION, Kanagawa (JP)

(72) Inventors: Hiroki Shimizu, Kanagawa (JP); Tomohiko Nakanishi, Kanagawa (JP)

(73) Assignee: NIDEC TOSOK CORPORATION, Kanagawa (JP)

( * ) Notice: Subject to any disclaimer, the term of this patent is extended or adjusted under 35 U.S.C. 154(b) by 144 days.

(21) Appl. No.: 17/844,661

(22) Filed: Jun. 20, 2022

(65) Prior Publication Data

US 2022/0412478 A1 Dec. 29, 2022

(30) Foreign Application Priority Data

Jun. 25, 2021 (JP) .................... 2021-106162

(51) Int. Cl.
| | |
|---|---|
| *F16K 27/00* | (2006.01) |
| *F16J 15/02* | (2006.01) |
| *F16J 15/06* | (2006.01) |
| *F16K 31/06* | (2006.01) |

(52) U.S. Cl.
CPC ............. *F16K 27/00* (2013.01); *F16J 15/022* (2013.01); *F16J 15/061* (2013.01); *F16J 15/064* (2013.01); *F16K 31/06* (2013.01)

(58) Field of Classification Search
CPC .......... F16J 15/02; F16J 15/021; F16J 15/064; F16J 15/0831
USPC ........................................ 277/609, 630, 637
See application file for complete search history.

(56) References Cited

U.S. PATENT DOCUMENTS

| | | | | |
|---|---|---|---|---|
| 1,998,791 | A | * | 4/1935 | Schanz ............... F25D 23/087 49/492.1 |
| 2,324,568 | A | * | 7/1943 | Duggan ............... B05B 12/20 277/609 |
| 2,945,715 | A | * | 7/1960 | Burrell ............... F02F 11/00 29/451 |
| 3,403,717 | A | * | 10/1968 | Lemelson ............ B21K 25/00 285/328 |
| 4,443,158 | A | * | 4/1984 | Bentele ............... F04C 27/005 277/637 |

(Continued)

FOREIGN PATENT DOCUMENTS

| | | |
|---|---|---|
| JP | 2018194113 A | 12/2018 |
| JP | 201965815 A | 4/2019 |

*Primary Examiner* — Robert K Arundale
(74) *Attorney, Agent, or Firm* — HAUPTMAN HAM, LLP

(57) ABSTRACT

In solenoid valve provided with: a valve case that has an annular collar expanding in a radial direction of an opening, which is opened at an axial end surface, and accommodates a valve body inside; and an annular seal member mounted in an annular recessed groove provided on one axial end surface of the collar of the valve case, the collar includes a through-hole penetrating the collar in an axial direction, and a connecting portion connecting the through-hole and the annular recessed groove, the through-hole has a reduced diameter portion, and the seal member includes an annular portion mounted in the annular recessed groove and a protruding portion protruding at least in the axial direction with respect to the annular portion and penetrating the through-hole, the protruding portion including an enlarged diameter portion having an outer diameter φD1 (>φd2) larger than an inner diameter φd2 of the reduced diameter portion of the through-hole.

6 Claims, 7 Drawing Sheets

(56) References Cited

U.S. PATENT DOCUMENTS

| | | | | |
|---|---|---|---|---|
| 4,602,125 A * | 7/1986 | West | .................... | H01L 23/4006 |
| | | | | 361/767 |
| 6,267,386 B1 * | 7/2001 | Loll | ..................... | H02G 15/113 |
| | | | | 277/609 |
| 6,832,444 B1 * | 12/2004 | MacNeil | ................. | G09F 7/002 |
| | | | | 277/648 |
| 8,136,279 B1 * | 3/2012 | Nearman | ............... | F16J 15/061 |
| | | | | 277/644 |
| 2006/0049585 A1 * | 3/2006 | Isono | ..................... | F16J 15/025 |
| | | | | 277/637 |
| 2014/0332536 A1 * | 11/2014 | Grant | ..................... | B65D 53/02 |
| | | | | 277/637 |
| 2014/0361498 A1 * | 12/2014 | Krug | ........................ | F16J 15/50 |
| | | | | 277/637 |

* cited by examiner

SOLENOID VALVE

CROSS-REFERENCE TO RELATED APPLICATIONS

The present invention claims priority under 35 U.S.C. § 119 to Japanese Patent Application No. 2021-106162 filed on Jun. 25, 2021, the entire content of which is incorporated herein by reference.

FIELD OF THE INVENTION

The present invention relates to a solenoid valve that secures sealing performance between a valve case and an attachment object when the solenoid valve is attached to the attachment object.

BACKGROUND

A solenoid valve is configured to move a valve body, accommodated in a valve case, by an electromagnetic force generated in a solenoid to control a pressure (hydraulic pressure, pneumatic pressure, hydraulic pressure, or the like) and a flow rate of a fluid, and a seal member, such as an O-ring, secures high sealing performance in an attachment portion for a housing of another device, that is, an attachment object or the like. Specifically, an annular recessed groove is formed in a joint end surface (attachment surface) of a collar (flange) formed at an axial end of the valve case, and the seal member having an annular shape is attached to the annular recessed groove. When such a solenoid valve is attached to the other device, the solenoid valve is attached by a fastening tool such as a bolt in a state where the collar of the valve case is in close contact with the housing or the like of the other device. At this time, the seal member mounted in the annular recessed groove of the collar is crushed, and thus, the high sealing performance is secured in the attachment portion of the solenoid valve with respect to the housing or the like of the other device, and leakage of the fluid from the attachment portion is reliably prevented.

Meanwhile, when the solenoid valve is assembled, the seal member is assembled into the annular recessed groove formed in the collar of the valve case, but a sectional diameter of the seal member is set to be smaller than a groove width in order to secure a crushing margin of the seal member. Thus, the seal member assembled in the annular recessed groove is easily detached from the annular recessed groove, which causes a problem of poor assembling workability.

Therefore, for example, conventionally, a packing (seal member) capable of preventing detachment and fall from the annular recessed groove is proposed. Specifically, in the packing, a protruding inner fall prevention portion, an outer fall prevention portion, and a detachment prevention portion are provided in an annular packing main body.

However, the conventionally proposed packing (seal member) does not always sufficiently achieve accurate positioning in the annular recessed groove in which the packing is mounted and prevention of detachment from the annular recessed groove, and there remains room for improvement in terms of assembling workability.

Further, conventional seal members including the seal member proposed above also has a problem that it is difficult to determine whether or not the seal member is assembled into the annular recessed groove since the seal member is invisible from the outside when being assembled into the annular recessed groove of the valve case and attached to the attachment object.

SUMMARY

An exemplary solenoid valve of the present invention is provided with: a valve case that has an annular collar expanding in a radial direction of an opening, which is opened at an axial end surface, and accommodates a valve body inside; and an annular seal member mounted in an annular recessed groove provided on one axial end surface of the collar of the valve case. The collar includes a through-hole penetrating the collar in an axial direction, and a connecting portion connecting the through-hole and the annular recessed groove. The through-hole has a reduced diameter portion. The seal member includes an annular portion mounted in the annular recessed groove and a protruding portion protruding at least in the axial direction with respect to the annular portion and penetrating the through-hole. The protruding portion includes an enlarged diameter portion having an outer diameter larger than an inner diameter of the reduced diameter portion of the through-hole.

In the exemplary solenoid valve of the present invention, a distal end of the protruding portion of the seal member protrudes to the outside from the through-hole.

The above and other elements, features, steps, characteristics and advantages of the present disclosure will become more apparent from the following detailed description of the preferred embodiments with reference to the attached drawings.

DETAILED DESCRIPTION

Hereinafter, an embodiment of the present invention will be described with reference to the drawings.

Figure 1:
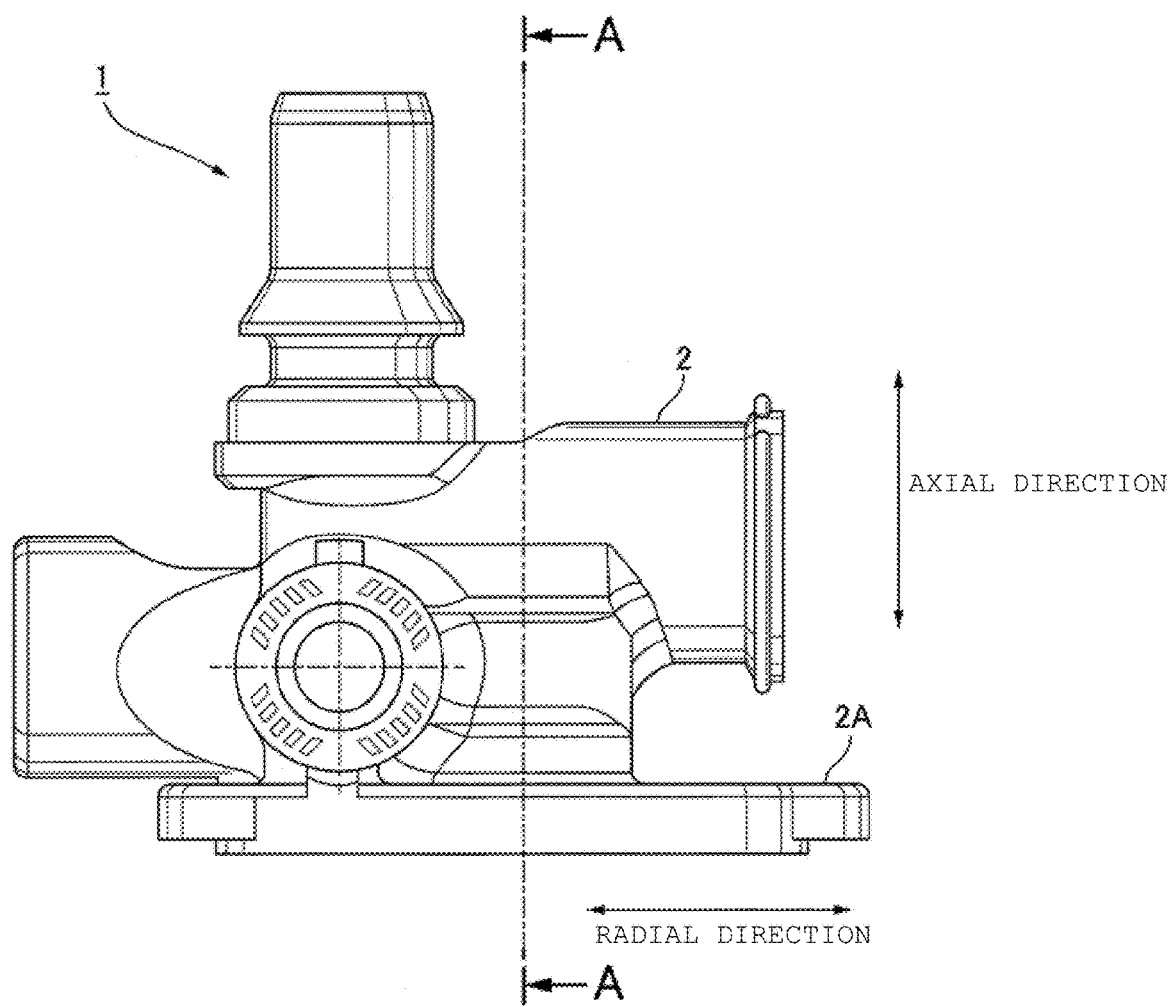
FIG. 1 is a side view of a solenoid valve according to the present invention.
Figure 2:
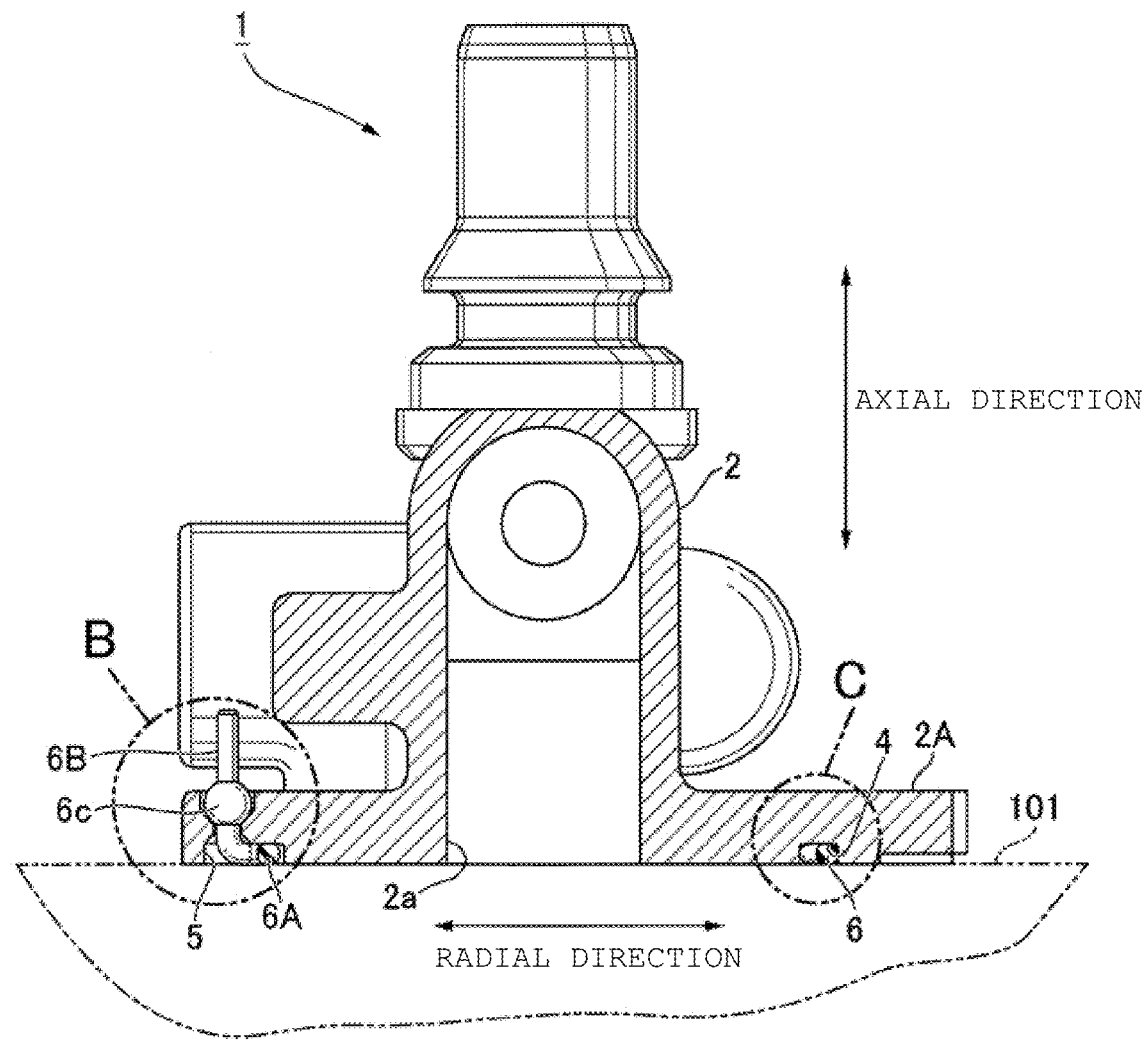
FIG. 2 is a sectional view taken along line A-A of FIG. 1.
Figure 3:
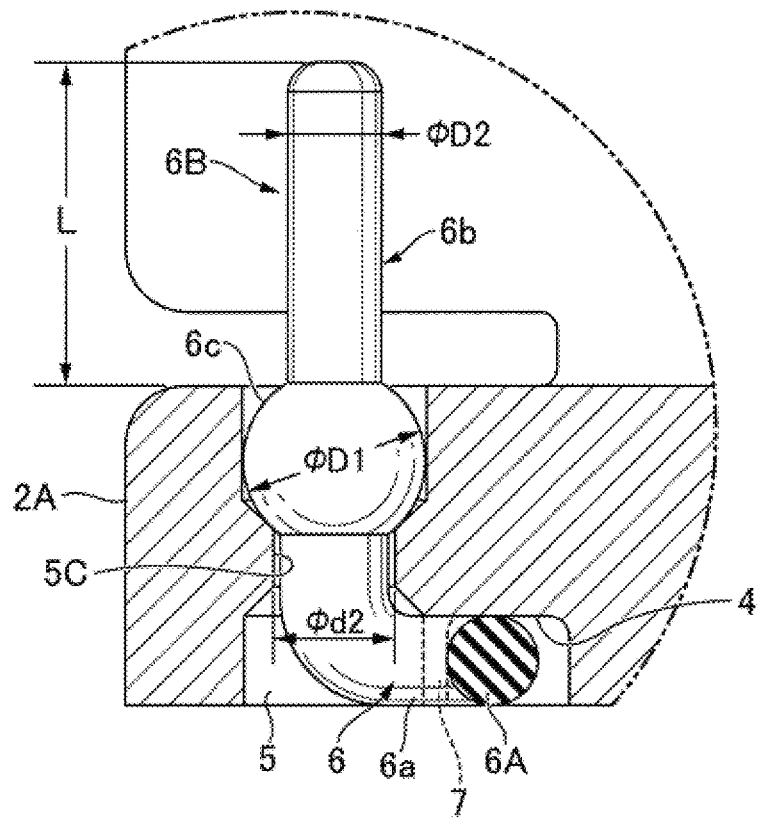
FIG. 3 is an enlarged detailed view of a portion B in FIG. 2.
Figure 4:
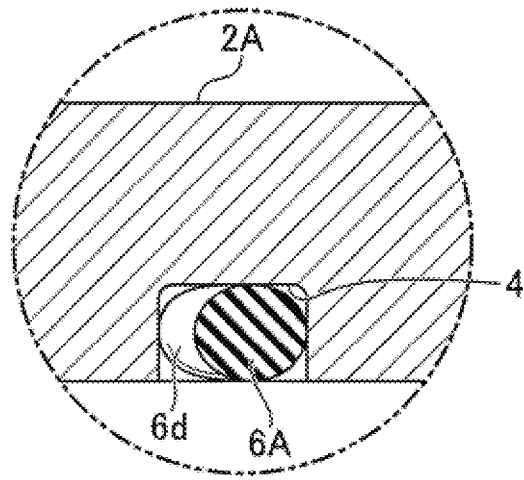
FIG. 4 is an enlarged detailed view of a portion C in FIG. 2.
Figure 5:
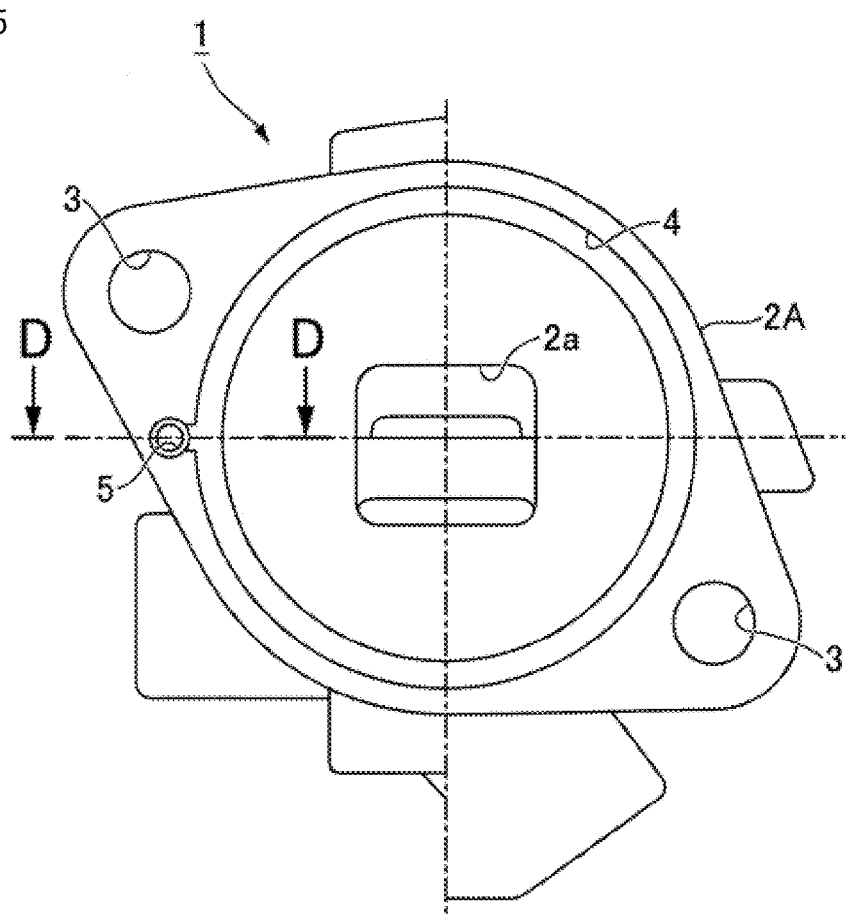
FIG. 5 is a bottom view of the solenoid valve according to the present invention in a state where a seal member is not assembled.
Figure 6:
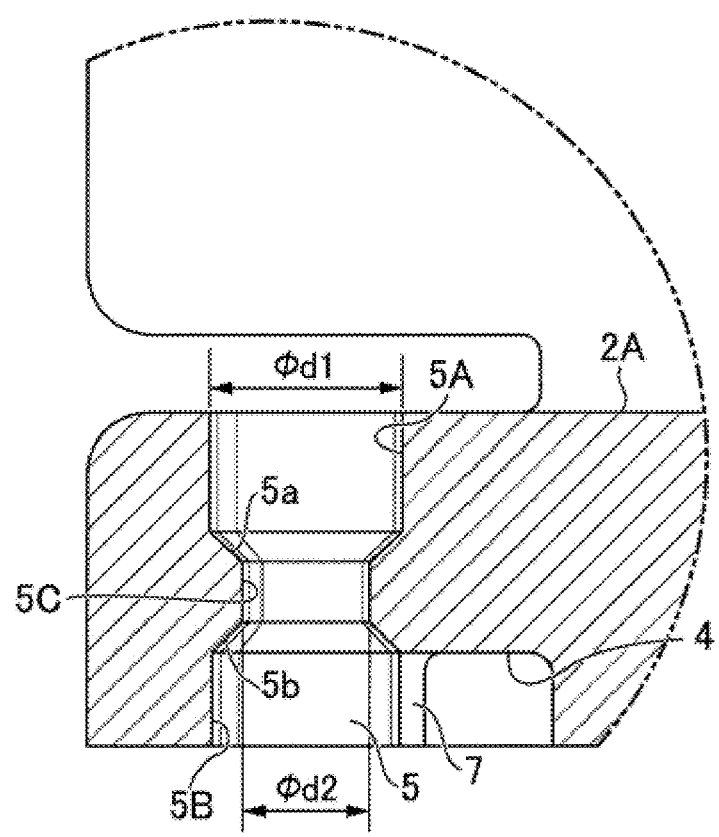
FIG. 6 is an enlarged sectional view taken along line D-D of FIG. 5.
Figure 7:
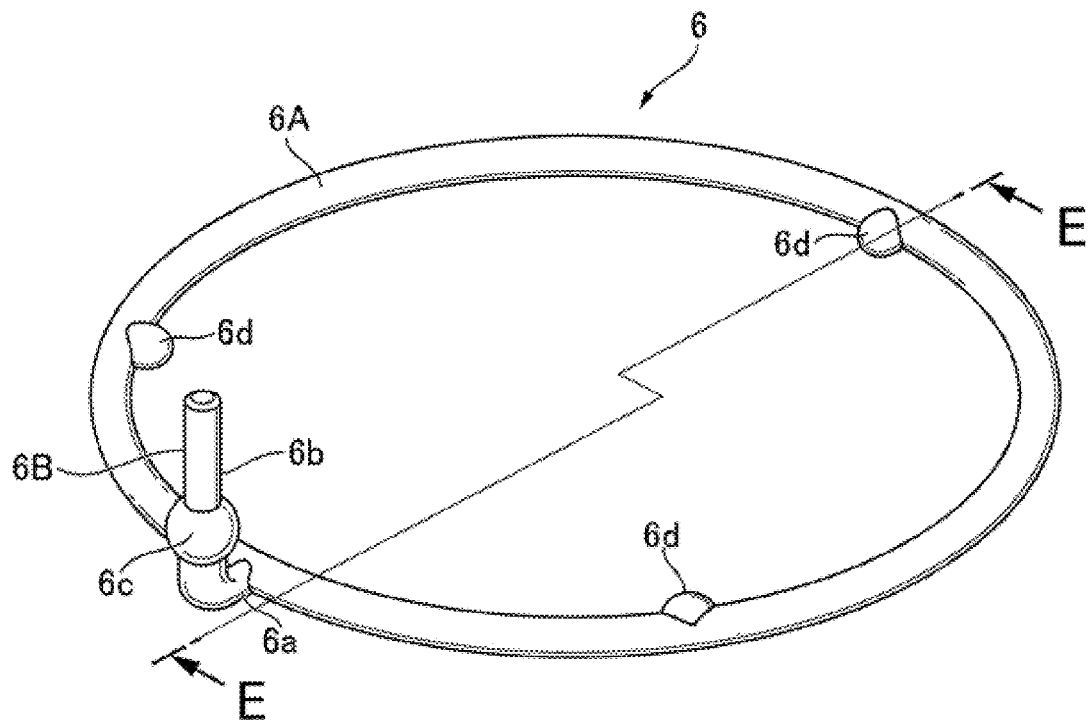
FIG. 7 is a perspective view of the seal member.
Figure 8:
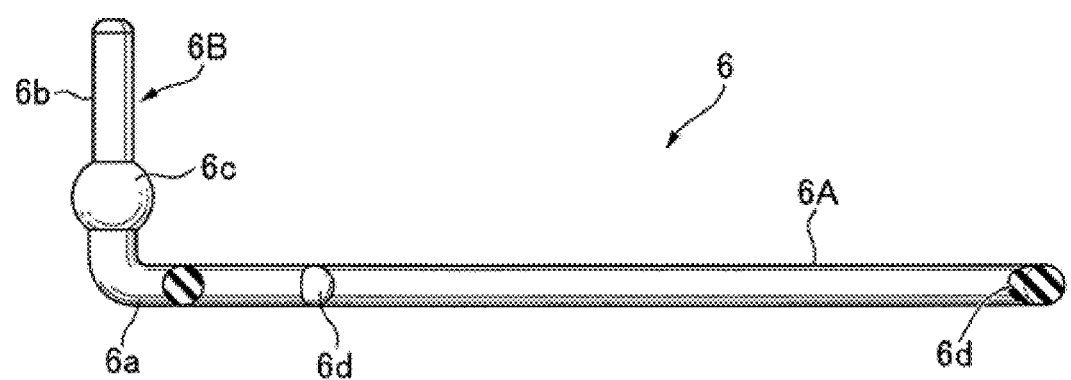
FIG. 8 is a sectional view taken along line E-E of FIG. 7.

FIG. 1 is a side view of a solenoid valve according to the present invention; FIG. 2 is a sectional view taken along line A-A of FIG. 1; FIG. 3 is an enlarged detailed view of a portion B in FIG. 2; FIG. 4 is an enlarged detailed view of a portion C in FIG. 2; FIG. 5 is a bottom view of the solenoid valve according to the present invention in a state where a seal member is not assembled; FIG. 6 is an enlarged sectional view taken along line D-D of FIG. 5; FIG. 7 is a perspective view of the seal member; and FIG. 8 is a sectional view taken along line E-E of FIG. 7. In the following description, the vertical direction of FIGS. 1 and 2 is referred to as an "axial direction", and the horizontal direction thereof is referred to as a "radial direction".

A solenoid valve 1 illustrated in FIGS. 1 and 2 opens and closes a valve body (not illustrated) accommodated in a valve case 2 by an electromagnetic force generated in a solenoid (not illustrated) by energization to control a pressure (hydraulic pressure, pneumatic pressure, hydraulic pressure, or the like) and a flow rate of a fluid, and a substantially rectangular opening 2a (see FIG. 5) is opened at one axial end (a lower end in FIGS. 1 and 2) of the valve case 2. Further, a collar (flange) 2A expanding in the radial direction from the opening 2a is integrally formed at the one axial end (lower end in FIGS. 1 and 2) of the valve case 2, and bolt insertion holes 3 each having a circular hole shape and penetrating in the axial direction (a direction perpendicular to the paper surface of FIG. 5) are each formed at two positions facing each other in the radial direction of the collar 2A as illustrated in FIG. 5.

Meanwhile, one axial end surface (lower end surface) of the collar 2A of the valve case 2 is a surface that comes into close contact with an attachment surface (upper surface in FIG. 2) of a housing 101 in a state where the solenoid valve 1 is attached to the housing 101 (see FIG. 2) of another device, and an annular recessed groove 4 that has a ring shape whose longitudinal section is rectangular and is centered on the opening 2a is formed on this surface as illustrated in FIGS. 2 and 5.

In addition, as illustrated in detail in FIG. 6, a through-hole 5 that has a circular hole shape with large and small different diameters and communicates with the annular recessed groove 4 is axially provided at one location in the circumferential direction of the collar 2A of the valve case 2. As illustrated in FIGS. 5 and 6, a groove-shaped connecting portion 7 that connects the annular recessed groove 4 and the through-hole 5 and extends along the radial direction is formed on an attachment surface (a lower surface in FIG. 6) of the flange 2A of the valve case 2. As illustrated in FIG. 6, a reduced diameter portion 5C having an inner diameter $\varphi d2$ ($<\varphi d1$), smaller than an inner diameter $\varphi d1$ of the other upper and lower holes 5A and 5B, is formed at an axially intermediate portion (intermediate height position) of the through-hole 5. That is, the holes 5A and 5B having a larger diameter than the reduced diameter portion 5C are formed above and below the reduced diameter portion 5C in the through-hole 5, and the upper hole 5A and the reduced diameter portion 5C are connected by a tapered surface 5a that decreases in diameter downward, and the lower hole 5B and the reduced diameter portion 5C are connected by a tapered surface 5b that increases in diameter downward.

Meanwhile, a ring-shaped seal member 6 illustrated in FIG. 7 is attached to the annular recessed groove 4 that has the ring shape and is formed on one axial end surface (attachment surface) of the collar 2A of the valve case 2 as illustrated in FIG. 2. The seal member 6 is an O-ring made of rubber, and an optimum material is selected from nitrile rubber (NBR), ethylene propylene rubber (EPDM), silicone rubber (VMQ), fluororubber (FKM), and the like as a material of the rubber.

As illustrated in FIGS. 7 and 8, the seal member 6 includes an annular portion 6A that has a ring shape and is mounted in the annular recessed groove 4 formed in the valve case 2, and a protruding portion 6B that integrally protrudes in the axial direction (vertically upward in FIGS. 7 and 8) from one location in the circumferential direction of the annular portion 6A and penetrates the through-hole 5 of the valve case 2. Here, the protruding portion 6B includes a radially extending portion 6a that integrally extends radially outward (leftward in FIG. 8) from the annular portion 6A, and an axially penetrating portion 6b that is bent at a right angle upward from the radially extending portion 6a and penetrates the through-hole 5 of the valve case 2.

As illustrated in FIG. 3, a spherical enlarged diameter portion 6c having an outer diameter $\varphi D1$ ($>\varphi d2$), larger than the inner diameter $\varphi d2$ (see FIG. 6) of the reduced diameter portion 5C formed in the through-hole 5 of the valve case 2, is integrally formed at an axially intermediate portion (intermediate height position) of the axially penetrating portion 6b of the seal member 6. Note that an outer diameter $\varphi D2$ of the axially penetrating portion 6b formed in the protruding portion 6B of the seal member 6 is set to be smaller than the inner diameter $\varphi d2$ (see FIG. 6) of the reduced diameter portion 5C formed in the through-hole 5 of the valve case 2 ($\varphi D2 < \varphi d2$), and the inner diameter $\varphi d1$ of the upper and lower holes 5A and 5B of the through-hole 5 is set to a value slightly larger than the outer diameter $\varphi D1$ of the enlarged diameter portion 6c formed in the seal member 6 ($\varphi d1 > \varphi D1$). In addition, the outer diameter $\varphi D2$ (see FIG. 3) of the axially penetrating portion 6b formed in the protruding portion 6B of the seal member 6 is set to be smaller than the inner diameter $\varphi d2$ (see FIG. 6) of the reduced diameter portion 5C of the through-hole 5 formed in the collar 2A of the valve case 2 ($\varphi D2 < \varphi d2$). In the state illustrated in FIG. 3 in which the seal member 6 is assembled into the valve case 2, a distal end of the protruding portion 6B (axially penetrating portion 6b) of the seal member 6 protrudes upward from the collar 2A of the valve case 2 by an illustrated length L.

As illustrated in FIG. 7, disengagement prevention protrusions 6d protruding radially inward are integrally provided at a plurality of locations (three locations in the illustrated example) in the circumferential direction of the annular portion 6A of the seal member 6 to protrude at equal angular pitches (the pitch of 120° in the illustrated example) in the circumferential direction. In the present embodiment, the three disengagement prevention protrusions 6d are provided to protrude on the annular portion 6A of the seal member 6, but the number of the disengagement prevention protrusions 6d is not limited to three and may be any number.

Next, how to assemble the seal member 6 configured as described above into the valve case 2 will be described hereinafter with reference to FIGS. 9A to 9C.

Figure 9A:
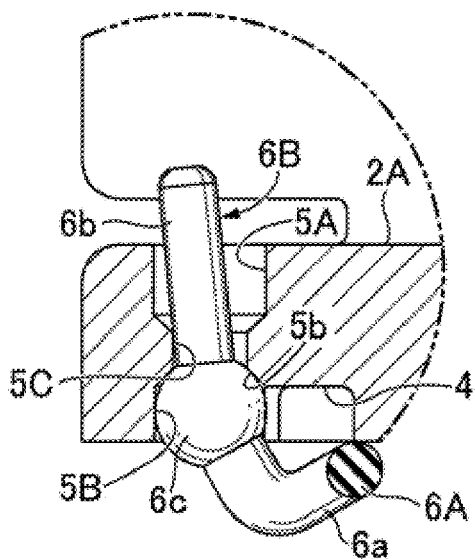
FIGS. 9A to 9C are partial longitudinal sectional views illustrating how to assemble the seal member in the solenoid valve according to the present invention in the order of processes.
Figure 9B:
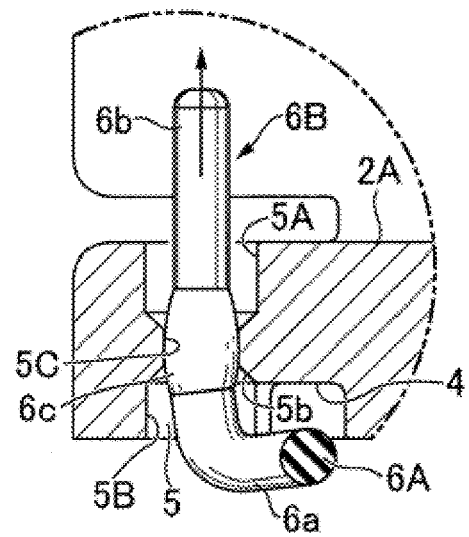
Figure 9C:
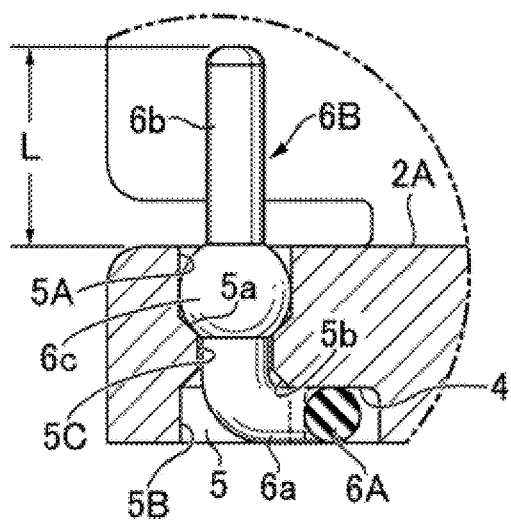

FIGS. 9A to 9C are partial longitudinal sectional views illustrating how to assemble the seal member 6 in the solenoid valve 1 according to the present invention in the order of processes. When the seal member 6 is assembled into the valve case 2, first, most of the seal member 6 except for a part of the annular portion 6A (a part where the protruding portion 6B is formed) is assembled into the annular recessed groove 4 formed in the collar 2A of the valve case 2. Next, the axially penetrating portion 6b formed in the protruding portion 6B of the seal member 6 is arranged to pass through the through-hole 5 of the valve case 2 from the distal end side of the axially penetrating portion 6b as illustrated in FIG. 9A. Specifically, the axially penetrating portion 6b formed in the protruding portion 6B of the seal member 6 is arranged to pass through the through-hole 5 from below in the drawing from the distal end side of the axially penetrating portion 6b. At this time, since the outer diameter $\varphi D1$ (see FIG. 3) of the enlarged diameter portion 6c formed in the intermediate portion of the protruding portion 6B of the seal member 6 is set to be larger than the inner diameter (02 (see FIG. 6) of the reduced diameter portion 5C of the through-hole 5 ($\varphi D1 > \varphi d2$) as described above, the enlarged diameter portion 6c hardly passes through the reduced diameter portion 5C of the through-hole 5 but abuts on the reduced diameter portion 5C as illustrated in the drawing.

As described above, in a state where the enlarged diameter portion 6c of the seal member 6 abuts on the reduced diameter portion 5C formed in the through-hole 5 of the valve case 2, the distal end of the axially penetrating portion 6b of the protruding portion 6B of the seal member 6 protrudes upward from the collar 2A of the valve case 2 as illustrated in FIG. 9B. Thus, the enlarged diameter portion 6c of the seal member 6 made of rubber is elastically deformed and crushed as illustrated in the drawing when a worker grips the protruding distal end of the axially penetrating portion 6b with fingers and pulls the distal end upward, so that the enlarged diameter portion 6c can pass through the reduced diameter portion 5C of the through-hole 5. At this time, the tapered surface 5b on the lower side of the through-hole 5 serves to guide the elastically deformed enlarged diameter portion 6c of the seal member 6 to the reduced diameter portion 5C of the through-hole 5.

As described above, when the seal member 6 is assembled into the valve case 2, the enlarged diameter portion 6c can be easily arranged to pass through the reduced diameter portion 5C of the through-hole 5 by pulling the distal end of the axially penetrating portion 6b formed in the seal member 6 protruding to the outside of the valve case 2, and thus, the assembling workability of the seal member 6 is improved.

As described above, when the enlarged diameter portion 6c of the seal member 6 passes through the reduced diameter portion 5C of the through-hole 5 of the valve case 2 and is assembled into the upper hole 5A, the enlarged diameter portion 6c returns to its original spherical shape by its own elastic restoring force. Thus, the enlarged diameter portion 6c is received by the tapered surface 5a on the upper side of the through-hole 5 functioning as a stopper as illustrated in FIG. 9C, and the passage through the reduced diameter portion 5C, that is, detachment of the seal member 6 from the annular recessed groove 4 of the valve case 2 is reliably prevented. Therefore, the workability of assembling the seal member 6 to the valve case 2 is improved, and the productivity of the solenoid valve 1 is also improved. In addition, since the enlarged diameter portion 6c formed in the protruding portion 6B of the seal member 6 is locked by the reduced diameter portion 5C formed in the through-hole 5 of the valve case 2, the seal member 6 is accurately positioned with respect to the valve case 2.

As illustrated in FIG. 9C, the assembly of the seal member 6 into the annular recessed groove 4 of the valve case 2 ends when the protruding portion 6B of the seal member 6 passes through the through-hole 5 of the valve case 2. In a state where the seal member 6 is assembled into the annular recessed groove 4 of the valve case 2 as described above, the disengagement prevention protrusions 6d protruding at the plurality of locations (three locations in the present embodiment) in the circumferential direction of the annular portion 6A of the seal member 6 are crushed in the annular recessed groove 4 and pressed against a side wall of the annular recessed groove 4 as illustrated in FIG. 4. Thus, the seal member 6 is also prevented from being detached from the annular recessed groove 4 by a frictional resistance force generated between the disengagement prevention protrusion 6d and the side wall of the annular recessed groove 4. This also enhances the assembling workability of the seal member 6 with respect to the annular recessed groove 4 of the valve case 2. When the work of assembling the seal member 6 into the annular recessed groove 4 of the valve case 2 ends, the radially extending portion 6a formed in the protruding portion 6B of the seal member 6 is accommodated in the lower hole 5B of the through-hole 5 penetrating the valve case 2 and the connecting portion 7, and is not exposed to the outside as illustrated in FIGS. 3 and 9C.

In addition, when the work of assembling the seal member 6 into the annular recessed groove 4 of the valve case 2 ends, the distal end of the protruding portion 6B (axially penetrating portion 6b) of the seal member 6 protrudes upward from the collar 2A of the valve case 2 by the illustrated length L as illustrated in FIGS. 3 and 9C. Thus, it is possible to easily and reliably determine whether or not the seal member 6 is assembled into the annular recessed groove 4 of the valve case 2 by visual observation. That is, it is possible to determine that the seal member 6 is assembled into the annular recessed groove 4 of the valve case 2 when the distal end of the protruding portion 6B (axially penetrating portion 6b) of the seal member 6 protrudes upward from the collar 2A of the valve case 2, and that the seal member 6 is not assembled into the annular recessed groove 4 of the valve case 2 when the distal end of the protruding portion 6B (axially penetrating portion 6b) of the seal member 6 does not protrude upward from the collar 2A of the valve case 2.

The solenoid valve 1 in which the seal member 6 is assembled into the annular recessed groove 4 of the valve case 2 through the above procedure is attached to the housing 101 of the other device by screwing bolts (not illustrated), inserted into two bolt insertion holes 3 (see FIG. 5) formed in the collar 2A, into the housing 101 in a state where the one axial end surface (attachment surface) of the collar 2A of the valve case 2 is in close contact with, for example, the attachment surface of the housing 101 (see FIG. 2) of the other device. When the solenoid valve 1 is attached to the housing 101 of the other device in this manner, the seal member 6 assembled into the annular recessed groove 4 formed in the valve case 2 of the solenoid valve 1 is crushed to reliably seal an attachment portion between the solenoid valve 1 and the housing 101 of the other device, and thus, leakage of a fluid from the attachment portion is reliably prevented. In this state, the radially extending portion 6a formed in the protruding portion 6B of the seal member 6 is crushed in the connecting portion 7 formed in the collar 2A of the valve case 2 and the lower hole 5B of the through-hole 5 as described above and comes into close contact with the housing 101 of the other device, and thus, leakage of the fluid from the through-hole 5 and the connecting portion 7 is reliably prevented.

Although the single protruding portion 6B is formed in the seal member 6 in the above embodiment, the protruding portion 6B may be formed at a plurality of locations in the circumferential direction of the seal member 6.

Additionally, the present invention is not limited to the embodiment described above, and various modifications can be made within the scope of the technical idea described in the scope of claims, the specification, and the drawings.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A solenoid valve comprising:
a valve case that has an annular collar expanding in a radial direction of an opening, which is opened at an axial end surface, and accommodates a valve body inside; and
an annular seal member mounted in an annular recessed groove provided on one axial end surface of the collar of the valve case,
wherein the collar includes a through-hole penetrating the collar in an axial direction, and a connecting portion connecting the through-hole and the annular recessed groove,
the through-hole has a reduced diameter portion, and
the seal member includes an annular portion mounted in the annular recessed groove and a protruding portion protruding at least in the axial direction with respect to the annular portion and penetrating the through-hole, the protruding portion including an enlarged diameter portion having an outer diameter larger than an inner diameter of the reduced diameter portion of the through-hole.

2. The solenoid valve according to claim 1, wherein the enlarged diameter portion is formed at an axially intermediate portion of the protruding portion.

3. The solenoid valve according to claim 1, wherein the protruding portion of the seal member includes a radially extending portion that extends in the radial direction from the annular portion and an axially penetrating portion that is bent in the axial direction from the radially extending portion and penetrates the through-hole, and
the radially extending portion is accommodated in the connecting portion.

4. The solenoid valve according to claim 1, wherein a distal end of the protruding portion of the seal member protrudes outward from the through-hole.

5. The solenoid valve according to claim 1, wherein disengagement prevention protrusions protruding radially inward are integrally provided to protrude at a plurality of locations in a circumferential direction of the annular portion of the seal member.

6. The solenoid valve according to claim 1, wherein the seal member is an O-ring made of rubber.

* * * * *